United States Patent
Shiraki

(10) Patent No.: US 10,564,588 B2
(45) Date of Patent: Feb. 18, 2020

(54) HIGH-VOLTAGE POWER SUPPLY APPARATUS AND IMAGE FORMING APPARATUS

(71) Applicant: CANON KABUSHIKI KAISHA, Tokyo (JP)

(72) Inventor: Yohei Shiraki, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/854,292

(22) Filed: Dec. 26, 2017

(65) Prior Publication Data

US 2018/0196386 A1    Jul. 12, 2018

(30) Foreign Application Priority Data

Jan. 11, 2017    (JP) ................. 2017-002469

(51) Int. Cl.
*G03G 15/08* (2006.01)
*G03G 15/00* (2006.01)
(Continued)

(52) U.S. Cl.
CPC ............. *G03G 15/80* (2013.01); *H02J 3/38* (2013.01); *H02M 7/04* (2013.01); *H02M 2001/0003* (2013.01)

(58) Field of Classification Search
CPC ............. G03G 15/80; G03G 15/1675; G03G 15/5004; G03G 15/0283; G03G 15/0266
See application file for complete search history.

(56) References Cited

U.S. PATENT DOCUMENTS

2007/0025753 A1* 2/2007 Saito ............... G03G 15/163
                                                    399/88
2011/0058842 A1* 3/2011 Kim .................. G03G 15/0283
                                                    399/88
(Continued)

FOREIGN PATENT DOCUMENTS

EP    2 713 217       4/2014
JP    2008-058510 A   3/2008

OTHER PUBLICATIONS

European Search Report dated Mar. 23, 2018 during prosecution of related European application No. 18150141.2.

*Primary Examiner* — Walter L Lindsay, Jr.
*Assistant Examiner* — Jessica L Eley
(74) *Attorney, Agent, or Firm* — Venable LLP

(57) ABSTRACT

A controller, which is a high-voltage power supply apparatus, includes: a secondary transfer high-voltage output device including a first high-voltage generator, which is configured to generate a first voltage having a positive voltage value, and a second high-voltage generator, which is connected in series to the first high-voltage generator, and is configured to generate a second voltage, the secondary transfer high-voltage output device being configured to output an output voltage, which is a sum of the first voltage and the second voltage; and a secondary transfer high-voltage control device, which is configured, in a case where the high-voltage power supply apparatus is switched from a state in which the first high-voltage generator is driven to output a first target voltage as the output voltage, to a state in which a second target voltage is output as the output voltage, to perform feedback control on the second voltage.

10 Claims, 10 Drawing Sheets

(51) Int. Cl.
  *H02J 3/38* (2006.01)
  *H02M 7/04* (2006.01)
  *H02M 1/00* (2006.01)

(56) References Cited

U.S. PATENT DOCUMENTS

| | | | |
|---|---|---|---|
| 2014/0016956 A1* | 1/2014 | Terasaki | G03G 15/1675 399/66 |
| 2014/0328603 A1 | 11/2014 | Mizutani | |
| 2015/0063855 A1* | 3/2015 | Nagasaki | G03G 15/166 399/88 |
| 2015/0268616 A1* | 9/2015 | Minobe | G03G 15/80 399/66 |
| 2016/0161888 A1* | 6/2016 | Wada | G03G 15/1665 399/66 |

* cited by examiner

HIGH-VOLTAGE POWER SUPPLY APPARATUS AND IMAGE FORMING APPARATUS

BACKGROUND OF THE INVENTION

Field of the Invention

The present invention relates to a high-voltage power supply apparatus, which can be used with an electrophotographic image forming apparatus.

Description of the Related Art

In order to increase productivity of an image forming apparatus, an image forming process speed has been increased, or when images are formed on a plurality of recording materials, a conveyance interval (sheet interval) of the recording materials has been reduced. An electrophotographic image forming apparatus may perform correction of a voltage value of a high voltage (transfer bias) used in transferring toner images onto the recording materials, density tone correction, or other processing in the sheet interval. The correction of the voltage value of the high voltage is performed by changing an output voltage of a high-voltage power supply apparatus. However, when sheet interval time is reduced, time allocated for the change of the output voltage is reduced. It is accordingly required to change the output voltage of the high-voltage power supply apparatus at high speed. In Japanese Patent Application Laid-open No. 2008-58510, there is disclosed an electrophotographic image forming apparatus including a high-voltage power supply apparatus, in which a high-voltage generator configured to generate a positive voltage and a high-voltage generator configured to generate a negative voltage are connected in series to each other. This high-voltage power supply apparatus stops the high-voltage generator configured to generate a high positive voltage for transferring toner images onto a recording material, at a predetermined timing, and at the same time, starts the high-voltage generator configured to generate a high negative voltage. As a result, an output voltage of the high-voltage power supply apparatus is changed at high speed.

The high-voltage power supply apparatus of Japanese Patent Application Laid-open No. 2008-58510 stops the high-voltage generator outputting the positive voltage at a timing of the sheet interval, and starts the high-voltage generator configured to generate the negative voltage, to thereby change the output voltage. Therefore, conditions that allow the output voltage to be changed at high speed are limited to a case in which a polarity of the output voltage is changed. Thus, the high-voltage power supply apparatus of Japanese Patent Application Laid-open No. 2008-58510 is not effective for a case in which the voltage is changed within a range in which the polarity is not changed.

It is a main object of the present invention to provide a high-voltage power supply apparatus capable of changing a voltage at high speed in a range in which a polarity of the voltage is not changed.

SUMMARY OF THE INVENTION

A high-voltage power supply apparatus according to the present disclosure includes: a high-voltage output device including: a first high-voltage generator, which is configured to generate a first voltage having a predetermined voltage value; and a second high-voltage generator, which is connected in series to the first high-voltage generator, and is configured to generate a second voltage, the high-voltage output device being configured to output an output voltage based on the first voltage and the second voltage; and a high-voltage control device, which is configured, in a case where the high-voltage power supply apparatus is switched from a state in which the first high-voltage generator is driven and the high-voltage output device is caused to output a first target voltage as the output voltage, to a state in which a second target voltage is output as the output voltage, to perform feedback control on the second voltage so that the output voltage becomes the second target voltage while continuing to drive the first high-voltage generator, the second target voltage having one of a polarity that is the same as a polarity of the first target voltage and an absolute value that is lower than an absolute value of the first target voltage, and a polarity that is opposite to the polarity of the first target voltage.

Further features of the present invention will become apparent from the following description of exemplary embodiments (with reference to the attached drawings).

DESCRIPTION OF THE EMBODIMENTS

Configuration of Image Forming Apparatus

Figure 1:
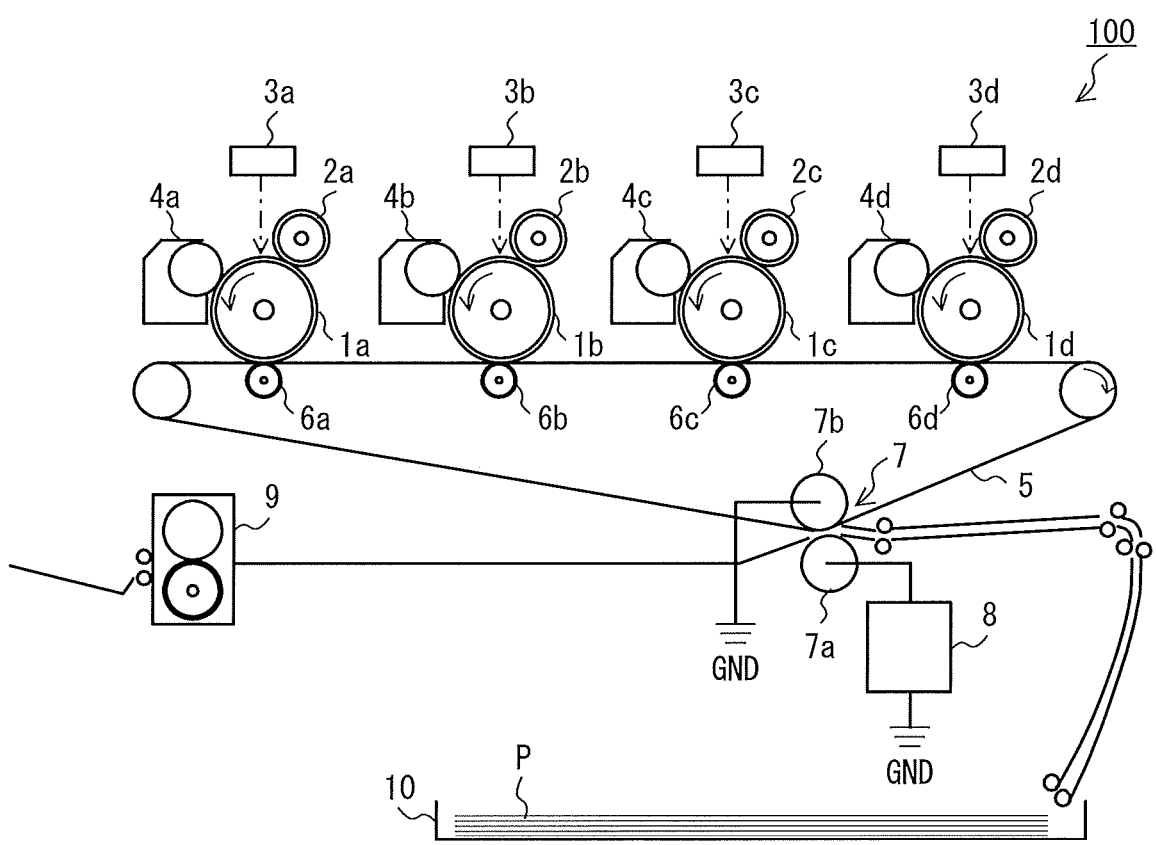
FIG. 1 is an explanatory diagram of a configuration of an image forming apparatus.

FIG. 1 is an explanatory diagram of a configuration of an electrophotographic image forming apparatus adopting a high-voltage power supply apparatus according to an embodiment of the present invention. This image forming apparatus, which is denoted by 100, is a color copying machine or a color multifunction peripheral, for example. The image forming apparatus 100 includes photosensitive drums 1a to 1d, charging rollers 2a to 2d, laser scanners 3a to 3d, developing devices 4a to 4d, an intermediate transfer belt 5, primary transfer rollers 6a to 6d, secondary transfer rollers 7a and 7b, which forma secondary transfer portion 7, and a fixing device 9. The secondary transfer roller 7a is connected to a secondary transfer high-voltage generator 8. Recording materials P, such as paper sheets, are stored in a sheet cassette 10.

The photosensitive drums 1a to 1d have electrostatic latent images formed thereon by being uniformly charged by the charging rollers 2a to 2d and then being exposed by the laser scanners 3a to 3d based on image signals. The photosensitive drums 1a to 1d have toner images formed thereon by having the electrostatic latent images thereon developed by the developing devices 4a to 4d. The photosensitive drum 1a has a yellow toner image formed thereon, for example. The photosensitive drum 1b has a magenta toner image formed thereon, for example. The photosensitive drum 1c has a cyan toner image formed thereon, for example. The photosensitive drum 1d has a black toner image formed thereon, for example. Thus, the photosensitive drums 1a to 1d are image bearing members configured to bear the toner images of respectively corresponding colors. Moreover, the charging rollers 2a to 2d, the laser scanners 3a to 3d, and the developing devices 4a to 4d form an image forming portion configured to form an image on the image bearing member. The toner images of the respective colors on the photosensitive drums 1a to 1d are multi-layer transferred onto the intermediate transfer belt 5 by the primary transfer rollers 6a to 6d. The toner images transferred onto the intermediate transfer belt 5 are conveyed to the secondary transfer portion 7 with rotation of the intermediate transfer belt 5. The intermediate transfer belt 5 is an image bearing member configured to bear the toner images of the respective colors.

The recording materials P are fed one by one from the sheet cassette 10 and conveyed to the secondary transfer portion 7. Each of the recording materials P is conveyed between the secondary transfer roller 7a and the secondary transfer roller 7b in the secondary transfer portion 7. The secondary transfer high-voltage generator 8 is a high-voltage output device, and is configured to apply a high transfer voltage to the secondary transfer roller 7a. The secondary transfer roller 7a has the high voltage applied thereto by the secondary transfer high-voltage generator 8, and the secondary transfer roller 7b is grounded, with the result that the toner images on the intermediate transfer belt 5 are electrostatically transferred onto the recording material P with an electric field between the secondary transfer roller 7a and the secondary transfer roller 7b. The toner images transferred onto the recording material P are fixed by the fixing device 9. With the above-mentioned configuration, the image forming apparatus 100 can form a color image on the recording material P.

Controller

Figure 2:
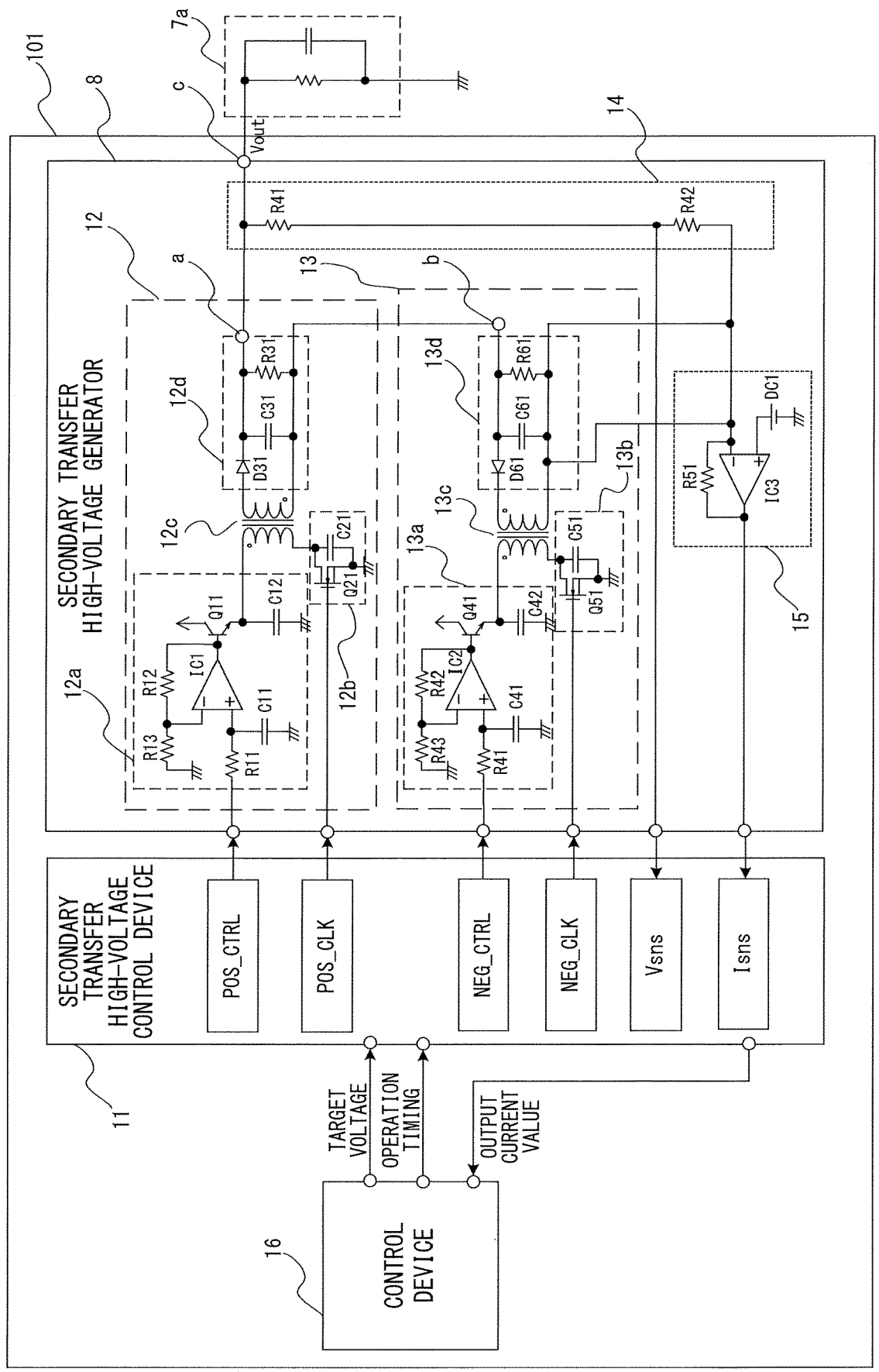
FIG. 2 is a configuration diagram of a controller.

FIG. 2 is a configuration diagram of a controller including the secondary transfer high-voltage generator 8, which is the high-voltage power supply apparatus. The controller, which is denoted by 101, is included in the image forming apparatus 100. The controller 101 includes, in addition to the secondary transfer high-voltage generator 8 configured to output the high voltage, a secondary transfer high-voltage control device 11 configured to control operation of the secondary transfer high-voltage generator 8, and a control device 16 configured to control operation of the entire image forming apparatus 100.

The control device 16 is configured to control a voltage value of an output voltage Vout of the secondary transfer high-voltage generator 8, which is the high voltage applied to the secondary transfer roller 7a, and an output timing of the output voltage Vout. To that end, the control device 16 transmits, to the secondary transfer high-voltage control device 11, a signal for specifying a target voltage and an operation timing. The secondary transfer high-voltage control device 11 is configured to perform digital feedback control on the secondary transfer high-voltage generator 8 such that the output voltage Vout from the secondary transfer high-voltage generator 8 becomes the target voltage specified by the control device 16. The secondary transfer high-voltage control device 11 is configured to control the operation timing of the secondary transfer high-voltage generator 8 based on the specification of the operation timing by the control device 16. The secondary transfer high-voltage generator 8 is configured to generate the output voltage Vout, which is the high voltage, based on the signals input from the secondary transfer high-voltage control device 11, and apply the generated output voltage Vout to the secondary transfer roller 7a. Moreover, the secondary transfer high-voltage generator 8 converts the output voltage Vout and an output current Iout flowing through an output terminal into detection signals Vsns and Isns, respectively, and inputs the detection signals Vsns and Isns to the secondary transfer high-voltage control device 11. The output current detection signal Isns is converted into a current value in the secondary transfer high-voltage control device 11, and then input to the control device 16. The control device 16 corrects, when executing pre-rotation active transfer voltage control (ATVC) and sheet interval ATVC, which are to be described later, the target voltage based on the output current detection signal Isns output from the secondary transfer high-voltage control device 11.

A configuration of the secondary transfer high-voltage generator 8 is described. The secondary transfer high-voltage generator 8 includes a first high-voltage generator 12, a second high-voltage generator 13, an output voltage sensor 14, and an output current sensor 15. The first high-voltage generator 12 is configured to generate a high positive voltage (transfer bias) mainly for transferring the toner images onto the recording material P. The second high-voltage generator 13 is configured to generate a high negative voltage (cleaning bias) mainly for transferring toner adhering to the secondary transfer roller 7a onto the intermediate transfer belt 5 for cleaning. The first high-voltage generator 12 and the second high-voltage generator 13 are each connected to the secondary transfer high-voltage control device 11, and driven based on signals input from the secondary transfer high-voltage control device 11. The first high-voltage generator 12 and the second high-voltage generator 13 are connected in series to each other.

The first high-voltage generator 12 includes a transformer input voltage control circuit 12a, a transformer drive circuit 12b, a transformer 12c, and a high-voltage smoothing circuit 12d. The first high-voltage generator 12 is configured to generate the high positive voltage based on a POS_CTRL signal and a POS_CLK signal, which are input from the secondary transfer high-voltage control device 11. The POS_CTRL signal is a voltage control signal for specifying a target voltage, and the POS_CLK signal is a drive control signal for the transformer 12c. The POS_CTRL signal is a pulse width modulation (PWM) signal having a constant frequency. The POS_CLK signal is a rectangular wave having a constant frequency and a fixed duty ratio.

The transformer input voltage control circuit 12a is a series regulator circuit configured to control a voltage applied to the transformer 12c based on the POS_CTRL signal. The transformer input voltage control circuit 12a includes a resistor R11 and a capacitor C11, which form a smoothing circuit, an operational amplifier IC1 and resistors R12 and R13, which form a non-inverting amplifier circuit, a transistor Q11, and a capacitor C12. The POS_CTRL signal, which is input from the secondary transfer high-voltage control device 11, has an amplitude of 3.4 V, for example. The resistor R11 and the capacitor C11 smooth the POS_CTRL signal, and input, to the operational amplifier IC1, the smoothed POS_CTRL signal as a voltage signal of 0 V to 3.4 V, for example. The operational amplifier IC1 and the resistors R12 and R13 have an amplification degree of 6 times, for example, and amplify an input voltage signal to 0 V to 20.4 V for output. Output of the operational amplifier IC1 is input to a primary side of the transformer 12c and the capacitor C12 for stabilizing the voltage via the transistor Q11 configured to amplify an electric current. When a duty ratio of the POS_CTRL signal is increased, the voltage input to the primary side of the transformer 12c is increased, and an output AC voltage output from a secondary side of the transformer 12c is also increased. In other words, the output AC voltage of the transformer 12c is controlled by changing the duty ratio of the POS_CTRL signal.

The transformer drive circuit 12b drives the transformer 12c through a switching operation. The transformer drive circuit 12b includes a field effect transistor (FET) Q21 and a capacitor C21. The transformer drive circuit 12b is connected to an end of a winding on the primary side of the transformer 12c that is opposite to an end to which the transformer input voltage control circuit 12a is connected. The transformer drive circuit 12b performs the switching operation with the POS_CLK signal input to the FET Q21 to resonate the capacitor C21 and the winding on the primary side of the transformer 12c. As a result, the transformer 12c performs a flyback resonant operation.

The high-voltage smoothing circuit 12d rectifies and smooths an AC voltage boosted by the transformer 12c. The high-voltage smoothing circuit 12d includes a diode D31, a capacitor C31, and a bleeder resistor R31. The diode D31 rectifies the AC voltage boosted by the transformer 12c. The capacitor C31 smooths the AC voltage rectified by the diode D31. The bleeder resistor R31 is connected to the secondary side of the transformer 12c in parallel to a load (in this example, the secondary transfer roller 7a), to which the smoothed AC voltage is applied.

The second high-voltage generator 13 has a configuration similar to that of the first high-voltage generator 12 except that a diode D61 of a high-voltage smoothing circuit 13d has a rectification polarity opposite to that of the diode D31 of the high-voltage smoothing circuit 12d of the first high-voltage generator 12. The rectification polarity of the diode D31 is positive, and the rectification polarity of the diode D61 is negative. The second high-voltage generator 13 is configured to generate the high voltage based on an NEG_CTRL signal and an NEG_CLK signal, which are input from the secondary transfer high-voltage control device 11. The NEG_CTRL signal is a voltage control signal for specifying a target voltage, and the NEG_CLK signal is a drive control signal for a transformer 13c. The NEG_CTRL signal is a PWM signal having a constant frequency. The NEG_CLK signal is a rectangular wave having a constant frequency and a fixed duty ratio. The high voltage generated by the second high-voltage generator 13 has a polarity that is the same as, and an absolute value that is lower than, those of the high voltage generated by the first high-voltage generator 12, or has a polarity that is opposite to that of the high voltage generated by the first high-voltage generator 12. A description of the configuration of the second high-voltage generator 13 is omitted.

The high voltage generated by the first high-voltage generator 12 at a point a is a voltage Vba with a point b of the secondary transfer high-voltage generator 8 being a reference voltage. The high voltage generated by the second high-voltage generator 13 at the point b is a voltage Vgb with the ground being a reference voltage. The output voltage Vout generated by the secondary transfer high-voltage generator 8 at a point c is a voltage with the ground being the reference voltage, and is a sum (Vgb+Vba) of the voltage Vba and the voltage Vgb.

In the image forming apparatus 100, the transfer bias has an absolute value that is larger than, and output time that is longer than, those of the cleaning bias. Therefore, a bleeder resistor R61 of the second high-voltage generator 13 is configured to have a resistance value that is smaller than that of the bleeder resistor R31 of the first high-voltage generator 12. The second high-voltage generator 13 is thus configured because, when the bleeder resistor R61 has a resistance value that is larger than that of the bleeder resistor R31, a voltage drop at the point b becomes larger at the time of outputting the transfer bias. When the voltage drop at the point b becomes larger, in order to apply a desired voltage to the secondary transfer roller 7a, the voltage Vba generated by the first high-voltage generator 12 is required to be further increased. As a result, it is required for the first high-voltage generator 12 to include a larger transformer 12c, and the cost is increased.

The output voltage Vout of the secondary transfer high-voltage generator 8 is sensed by the output voltage sensor 14. The output voltage sensor 14 includes a resistor R41 and a resistor R42. The output voltage Vout is divided by the resistor R41 and the resistor R42 in a range of from 0 V to 3.4 V, for example, and is input as the output voltage detection signal Vsns to the secondary transfer high-voltage control device 11.

The output current Iout flowing through the point c of the secondary transfer high-voltage generator 8 is sensed by the output current sensor 15. The output current sensor 15 includes an operational amplifier IC3, a current sensing resistor R51, and a reference voltage DC1. The current sensing resistor R51 is provided on a path along which the electric current flows between the ground and the point c, and connects an output terminal and a negative input terminal of the operational amplifier IC3 through negative feedback. Therefore, an output voltage of the operational amplifier IC3 is changed based on the electric current flowing through the current sensing resistor R51 with reference to the reference voltage DC1, which is input to a positive input terminal of the operational amplifier IC3. The output voltage of the operational amplifier IC3 is input as the output current detection signal Isns to the secondary transfer high-voltage control device 11.

A configuration of the secondary transfer high-voltage control device 11 is described. The secondary transfer high-voltage control device 11 is configured to perform the digital feedback control such that the output voltage Vout of the secondary transfer high-voltage generator 8 becomes the target voltage. The secondary transfer high-voltage control device 11 acquires a target voltage signal and an operation timing signal from the control device 16. The operation timing signal is a timing signal for switching the output voltage Vout ON/OFF and control for changing the output voltage Vout at high speed. Moreover, the secondary transfer high-voltage control device 11 acquires the output voltage detection signal Vsns and the output current detection signal Isns from the secondary transfer high-voltage generator 8. The secondary transfer high-voltage control device 11 performs A/D conversion on the output voltage detection signal Vsns and the output current detection signal Isns, converts respective results of the A/D conversion into an output voltage value and an output current value, respectively, and averages results of the conversion. As a result, an output voltage value Vval and an output current value Ival are derived. The secondary transfer high-voltage control device 11 performs feedback calculation based on a deviation between the target voltage, which is specified by the target voltage signal input from the control device 16, and the output voltage value Vval, to thereby control the duty ratio of the POS_CTRL signal or the NEG_CTRL signal. The secondary transfer high-voltage control device 11 thus performs feedback control on the output voltage Vout of the secondary transfer high-voltage generator 8. Moreover, the secondary transfer high-voltage control device 11 inputs the output current value Ival to the control device 16.

A configuration of the control device 16 is described. The control device 16 is a processor configured to control the operation of the entire image forming apparatus 100. The control device 16 acquires the output current value Ival from the secondary transfer high-voltage control device 11, and determines, in the pre-rotation ATVC and the sheet interval ATVC, which are to be described later, the target voltage based on a relationship between the voltage applied to the secondary transfer roller 7a and the output current value Ival. During image formation processing, the control device 16 inputs the target voltage signal for specifying the target voltage and the operation timing signal to the secondary transfer high-voltage control device 11.

Transfer Bias Control

Figure 3A:
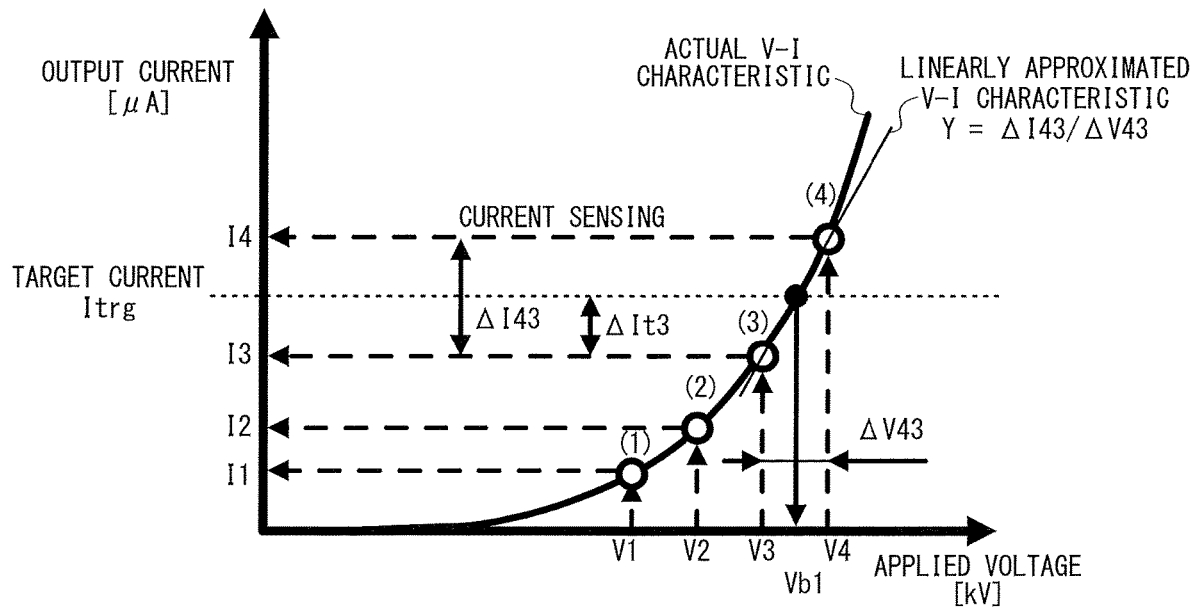
FIG. 3A and FIG. 3B are explanatory graphs of active transfer voltage control (ATVC).
Figure 3B:
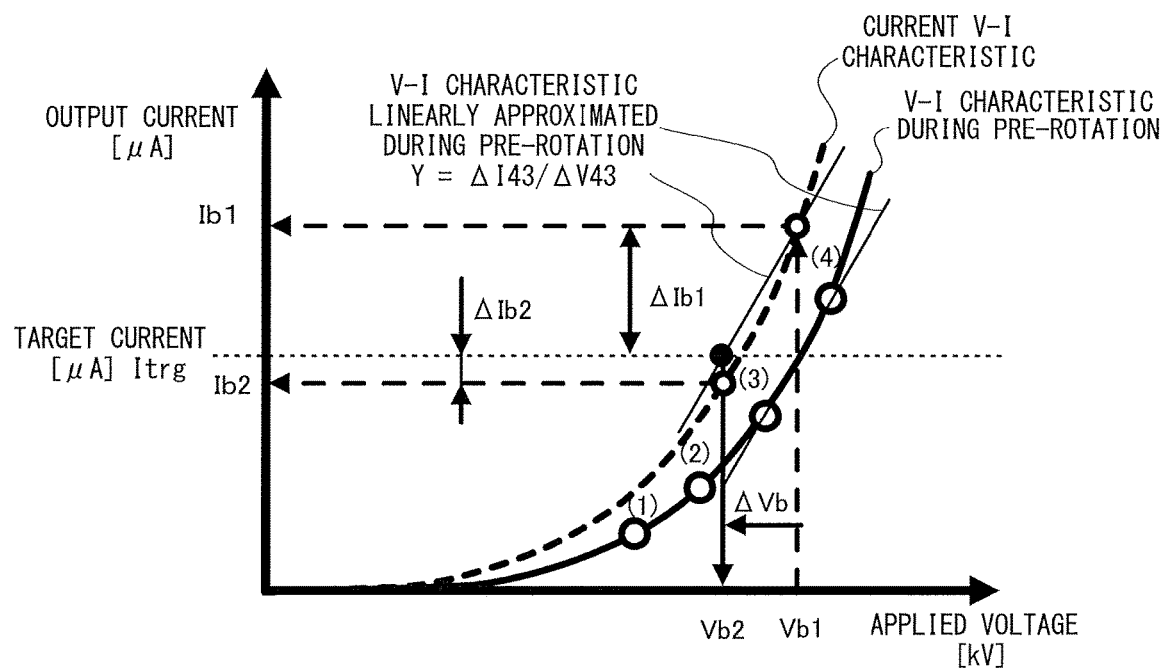

A method of determining the voltage (transfer bias) applied from the secondary transfer high-voltage generator 8 to the secondary transfer portion 7 during image formation is described. When the toner images are transferred from the intermediate transfer belt 5 onto the recording material P, in order to apply a constant voltage irrespective of an amount of toner used for the image formation, the secondary transfer high-voltage generator 8 applies a predetermined transfer bias to the secondary transfer portion 7 through constant voltage control. At this time, the secondary transfer high-voltage generator 8 is required to allow an appropriate target current Itrg to flow through the secondary transfer portion 7. This is because, when the electric current flowing through the secondary transfer portion 7 is small, the toner images on the intermediate transfer belt 5 are not sufficiently transferred, and when the electric current is large, abnormal discharge occurs to cause an image defect. However, the secondary transfer roller 7a forming the secondary transfer portion 7 is changed in impedance characteristic depending on a surrounding environment, for example, temperature or humidity. Therefore, the pre-rotation ATVC is performed. FIG. 3A and FIG. 3B are explanatory graphs of ATVC.

The pre-rotation ATVC is processing of calculating a reference voltage Vb1 with which the appropriate target current Itrg is allowed to flow through the secondary transfer portion 7 during a preparatory operation for the image formation. The pre-rotation ATVC is described with reference to FIG. 3A. The pre-rotation ATVC is executed prior to the image formation, that is, during pre-rotation, which is a preparation period for the image formation. The secondary transfer high-voltage control device 11 increases the output voltage Vout (applied voltage) of the secondary transfer high-voltage generator 8, which is applied to the secondary transfer roller 7a, stepwise from V1 to V4, and senses electric currents I1 to I4 of the secondary transfer portion 7 respectively corresponding to the applied voltages. The secondary transfer high-voltage control device 11 uses two points, that is, an output voltage V4 at which the sensed current value first exceeds the target current Itrg and an output voltage V3 immediately preceding the output voltage V4 to linearly approximate a characteristic (V-I characteristic) between the voltage and the electric current of the secondary transfer roller 7a ($Y=\Delta I43/\Delta V43$). The linear approximation is performed using the two points, that is, the point (3) and the point (4) that are closest to the target current Itrg because the V-I characteristic of the secondary transfer roller 7a is non-linear, and because accuracy is low when the V-I characteristic is linearly approximated in a range in which the current values are significantly different. The secondary transfer high-voltage control device 11 calculates a difference $\Delta It3$ between the target current Itrg and the sensed current I3. The secondary transfer high-voltage control device 11 determines the reference voltage Vb1 ($=V3+\Delta It3/Y$) based on a relationship among the difference $\Delta It3$ in current, the linearly approximated V-I characteristic ($Y=\Delta I43/\Delta V43$), and the output voltage V3.

Moreover, in the secondary transfer portion 7, during sheet passage in which the recording material P is conveyed through the secondary transfer portion 7, a resistance is caused by the recording material P in addition to the secondary transfer roller 7a. Therefore, a reference voltage Vb actually applied to the secondary transfer portion 7 is a voltage obtained by adding, to the reference voltage Vb1, a voltage obtained by taking into consideration the resistance of the recording material P. The voltage obtained by taking into consideration the resistance of the recording material P, which is added to the reference voltage Vb1, is referred to as "material voltage Vp". The material voltage Vp is set based on temperature and humidity, which are acquired by environment sensors (not shown) mounted in the image forming apparatus 100, a material type of the recording material P, and a resistance of the recording material P that is different for a front side and a back side of the recording material P, and other factors. Since paper is used as the recording material, in the following, the material voltage Vp is described as "paper voltage". The paper voltage Vp is held in advance in a storage device (not shown) mounted in the image forming apparatus 100. The transfer bias, which is applied to the secondary transfer roller 7a during secondary transfer, is a sum of the reference voltage Vb1 and the paper voltage Vp. As a result, the appropriate target current Itrg flows through the secondary transfer portion 7 during the sheet passage.

However, when the image formation processing is performed in succession, the temperature and the humidity inside the image forming apparatus 100 are changed, and electric characteristics of the secondary transfer roller 7a are changed as durability wears off. As a result, an impedance of the secondary transfer roller 7a is changed during the image formation processing, and the appropriate target current Itrg is not allowed to flow with the reference voltage Vb1 calculated in the pre-rotation ATVC any more. To address this problem, the secondary transfer high-voltage control device 11 corrects the reference voltage Vb1 through the sheet interval ATVC. In the sheet interval ATVC, the reference voltage Vb1 is corrected based on the output current value Ival sensed between a recording material P1 and a recording material P2, which passes through the secondary transfer portion 7 after the recording material P1, during successive image formation, and the V-I characteristic of the secondary transfer roller 7a that is linearly approximated during the pre-rotation ATVC.

Figure 4:
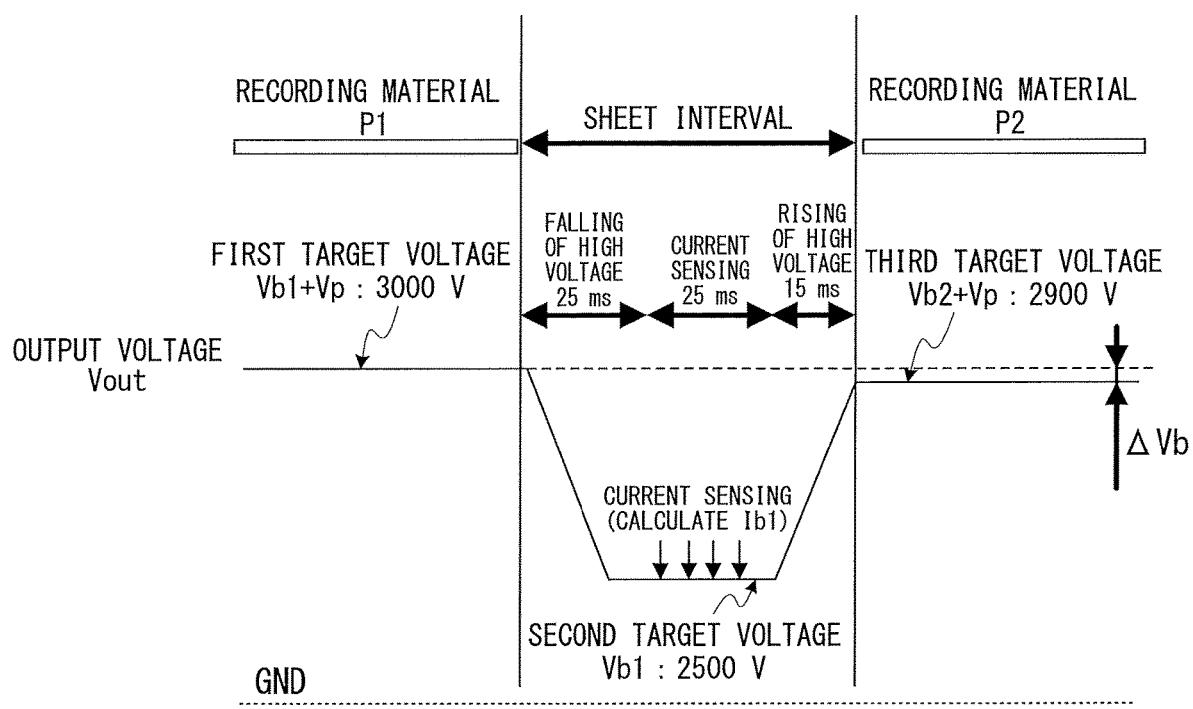
FIG. 4 is an explanatory chart of a sequence of sheet interval ATVC.

A sequence of the sheet interval ATVC is described with the reference voltage Vb1 calculated in the pre-rotation ATVC being 2,500 V, a reference voltage Vb2 corrected in the sheet interval ATVC being 2,400 V, and the paper voltage Vp of the recording material being 500 V. FIG. 4 is an explanatory chart of the sequence of the sheet interval ATVC.

The V-I characteristic of the secondary transfer roller 7a is non-linear. Therefore, in order to calculate the reference voltage Vb accurately in a sheet interval, it is desired to sense the electric current under a state in which a voltage with which an electric current that is equivalent to that at the time of transfer, that is, a voltage that is as close to the reference voltage Vb as possible is applied in the sheet interval. Here, the transfer bias for the recording material P1 immediately before the sheet interval ATVC is performed is defined as a first target voltage (=Vb1+Vp=3,000 V). At the time when the transfer onto the recording material P1 has been finished at the first target voltage, the secondary transfer high-voltage generator 8 causes the output voltage (first target voltage) to fall to a second target voltage (Vb1=2,500 V), which is the reference voltage Vb1 calculated in the pre-rotation ATVC. The secondary transfer high-voltage control device 11 senses the output current at predetermined intervals while the second target voltage (Vb1=2,500 V) is applied, and averages the sensed results. The secondary transfer high-voltage control device 11 corrects the reference voltage Vb1 based on an output current value Ib1, which is a result of the averaging, and the applied reference voltage Vb1 to derive the reference voltage Vb2.

FIG. 3B is an explanatory graph of a method of calculating a correction amount ΔVb at this time. First, the secondary transfer high-voltage control device 11 calculates a difference ΔIb1 (=Itrg−Ib1) between the output current value Ib1 at the time when the second target voltage (reference voltage Vb1) is output and the target current Itrg. Next, the secondary transfer high-voltage control device 11 derives the correction amount ΔVb (=ΔIb1/Y) of the reference voltage Vb1 based on a relationship between the calculated difference ΔIb1 between the current values and the V-I characteristic (Y=ΔI43/ΔV43) linearly approximated in the pre-rotation ATVC. Finally, the secondary transfer high-voltage control device 11 adds the correction amount ΔVb (−100 V) to the reference voltage Vb1 (=2,500 V) to derive the corrected reference voltage Vb2 (=Vb1+ΔVb=2,400 V). At this time, an actual electric current flowing through the secondary transfer portion 7 is a current value Ib2, which has an error ΔIb2 from the target current Itrg. In this manner, the reference voltage Vb1 is corrected to the reference voltage Vb2 through the sheet interval ATVC, and the error between the electric current flowing through the secondary transfer portion 7 and the target current Itrg is reduced from ΔIb1 to ΔIb2.

After the reference voltage Vb2 is calculated and before the next recording material P2 is conveyed to the secondary transfer roller 7a, it is required to cause the transfer bias to rise to a third target voltage (Vb2+Vp=2,900 V) corresponding to the next recording material P2. Here, when it is assumed that sheet interval time is 65 milliseconds, and that time required to sense the electric current is 25 milliseconds, the secondary transfer high-voltage generator 8 is required to complete the rising and the falling of the output voltage Vout within 40 milliseconds in total. For example, the secondary transfer high-voltage generator 8 is required to complete the falling and the rising of the output voltage Vout in 25 milliseconds and 15 milliseconds, respectively.

A control sequence of the secondary transfer high-voltage control device 11 during the sheet interval ATVC is described. When performing transfer onto the recording material P1, the secondary transfer high-voltage control device 11 performs the feedback control on the duty ratio of the POS_CTRL signal based on a deviation between the transfer bias (first target voltage=Vb1+Vp) of the recording material P1 and the output voltage value Vval. After completing the transfer onto the recording material P1, the secondary transfer high-voltage control device 11 fixes the duty ratio of the POS_CTRL signal to a value at the time of completion of the transfer. Under such state, the secondary transfer high-voltage control device 11 inputs the NEG_CLK signal to the second high-voltage generator 13 to drive the transformer 13c. The secondary transfer high-voltage control device 11 also performs the feedback control on the duty ratio of the NEG_CTRL signal based on a deviation between the reference voltage Vb1 (second target voltage) calculated in the pre-rotation ATVC and the output voltage value Vval. After the electric current is sensed, the secondary transfer high-voltage control device 11 corrects the reference voltage Vb1 based on the output current value Ival, which is a result of the sensing, to determine the reference voltage Vb2 (sheet interval ATVC). Thereafter, the secondary transfer high-voltage control device 11 stops the NEG_CLK signal to stop driving the transformer 13c. The secondary transfer high-voltage control device 11 performs the feedback control on the duty ratio of the POS_CTRL signal based on a deviation between a transfer bias (third target voltage=Vb2+Vp) of the recording material P2 and the output voltage value Vval.

Figure 5:
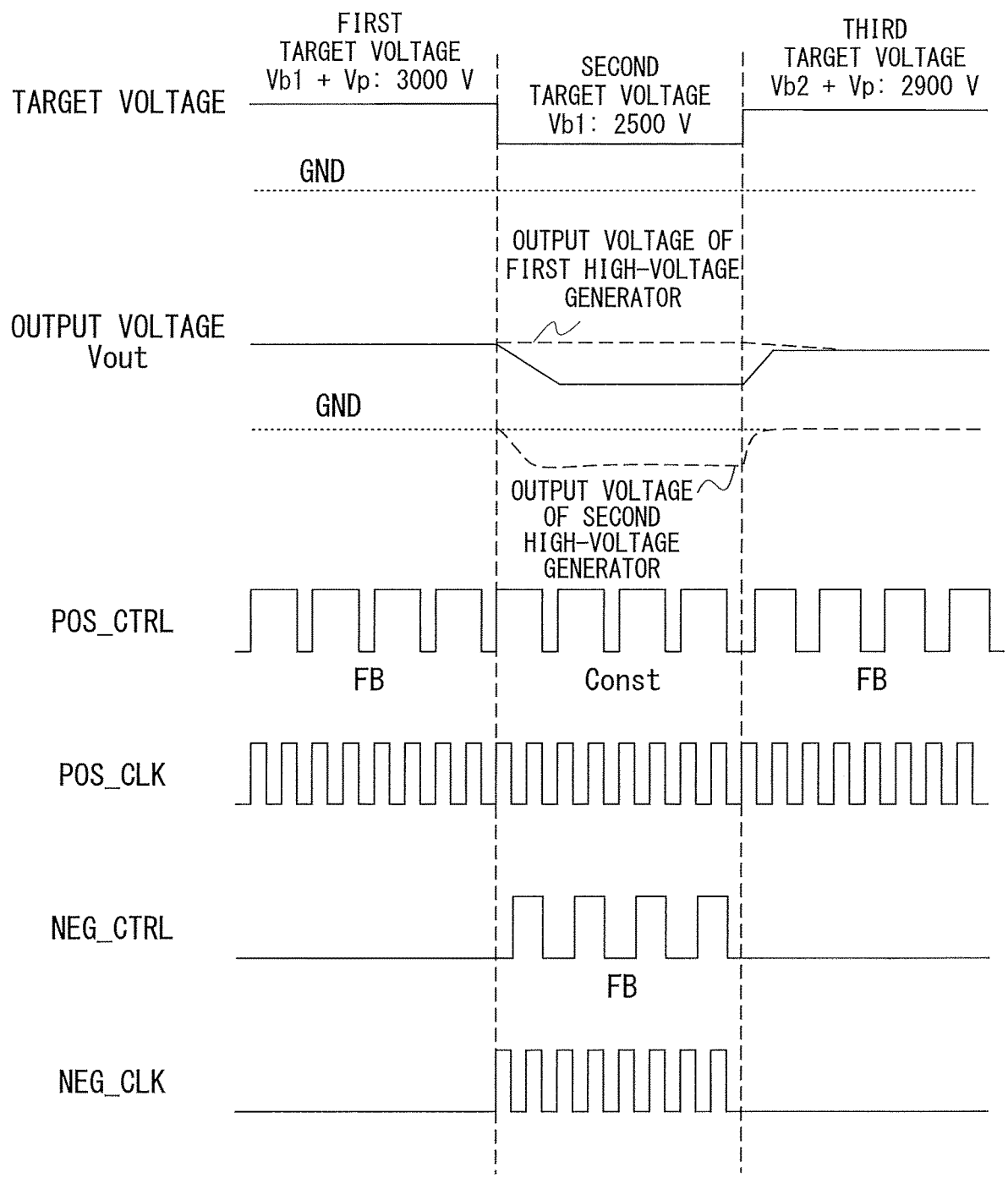
FIG. 5 is an explanatory chart of a control sequence of a secondary transfer high-voltage control device during the sheet interval ATVC.

FIG. 5 is an explanatory chart of a control sequence of the secondary transfer high-voltage control device 11 during the sheet interval ATVC. In FIG. 5, "FB" indicates that the duty ratio of the POS_CTRL signal or the NEG_CTRL signal is subjected to the feedback control so as to eliminate the deviation between a target voltage value and the output voltage value. The feedback control is performed by proportional-integral-differential (PID) control, for example. Meanwhile, "CONST" indicates that the duty ratio of the POS_CTRL signal is set constant irrespective of the output voltage value.

First, in order to drive the first high-voltage generator 12 without driving the second high-voltage generator 13 to transfer the toner images onto the recording material P1, the secondary transfer high-voltage control device 11 drives the transformer 12c with the POS_CLK signal. Then, the secondary transfer high-voltage control device 11 performs the PID control on the duty ratio of the POS_CTRL signal based on the deviation between the output voltage value sensed by the output voltage sensor 14 and the first target voltage (3,000 V). As a result, the secondary transfer high-voltage control device 11 may perform the feedback control on the output voltage Vout, and output the output voltage Vout, which has become the first target voltage (3,000 V), from the point c of the secondary transfer high-voltage generator 8.

Next, in order to execute the sheet interval ATVC, the secondary transfer high-voltage control device 11 fixes the POS_CTRL signal to the duty ratio at the time of completion of the transfer of the toner images onto the recording material P1. The output voltage Vout at the time of completion of the transfer of the toner images is the transfer bias (first target voltage: Vb1+Vp), and when the first high-voltage generator 12 is driven with the duty ratio, a voltage that is higher than the second target voltage (reference voltage Vb1: 2,500 V) may be output. At the same time, the secondary transfer high-voltage control device 11 generates the NEG_CLK signal to drive the transformer 13c of the second high-voltage generator 13. Then, the secondary transfer high-voltage control device 11 performs the PID control on the duty ratio of the NEG_CTRL signal based on the deviation between the output voltage value sensed by the output voltage sensor 14 and the second target voltage (2,500 V). As a result, the secondary transfer high-voltage control device 11 may perform the feedback control on the output voltage Vout to output the output voltage Vout, which has become the second target voltage (2,500 V), from the point c of the secondary transfer high-voltage generator 8.

The sheet interval ATVC may be performed to cause the output voltage Vout of the secondary transfer high-voltage generator 8 to fall at high speed. The reason is as follows. The high-voltage smoothing circuit 12d of the first high-voltage generator 12 is slow in discharging the smoothing capacitor C31 because the resistance value of the bleeder resistor R31 is large. Therefore, even when the secondary transfer high-voltage control device 11 reduces the duty ratio of the POS_CTRL signal to cause the output voltage Vout to fall with only the first high-voltage generator 12, it takes time for the output voltage Vout to reach the target voltage. Starting of the second high-voltage generator 13 is faster than the discharging of the high-voltage smoothing circuit 12d of the first high-voltage generator 12. Therefore, the secondary transfer high-voltage control device 11 starts the second high-voltage generator 13 at the time of falling of the output voltage Vout to perform the feedback control such that the output voltage Vout becomes the second target voltage (2,500 V). As a result, the output voltage Vout of the secondary transfer high-voltage generator 8 falls faster than when only the first high-voltage generator 12 is controlled to cause the output voltage Vout to fall. The secondary transfer high-voltage control device 11 continues to drive the transformer 12c of the first high-voltage generator 12 with the POS_CLK signal also during the sheet interval ATVC.

After the output voltage Vout of the secondary transfer high-voltage generator 8 has converged to the second target voltage (2,500 V), the secondary transfer high-voltage control device 11 senses the output current of the secondary transfer high-voltage generator 8 with the output current sensor 15. The output current sensor 15 executes the current detection four times at regular intervals, and averages results of the sensing to calculate the output current value. The secondary transfer high-voltage control device 11 recalculates and corrects the reference voltage Vb based on the voltage value of the applied output voltage Vout and the output current value. The secondary transfer high-voltage control device 11 stops the NEG_CTRL signal and the NEG_CLK signal to stop the second high-voltage generator 13. At the same time, the secondary transfer high-voltage control device 11 performs the PID control on the duty ratio of the POS_CTRL signal based on the deviation between the output voltage value sensed by the output voltage sensor 14 and the third target voltage (2,900 V). In this manner, the secondary transfer high-voltage control device 11 may perform the feedback control on the output voltage Vout, and output the output voltage Vout, which has become the third target voltage (2,900 V), from the point c of the secondary transfer high-voltage generator 8.

The output voltage Vout of the secondary transfer high-voltage generator 8 rises at high speed when being changed from the second target voltage (2,500 V) to the third target voltage (2,900 V). The output voltage Vout may rise at high speed because the resistance value of the bleeder resistor R61 of the second high-voltage generator 13 is small, and because a capacitor C61 is discharged fast.

Operations of Sheet Interval ATVC During Image Formation

Figures 6A, 6B, 6C:
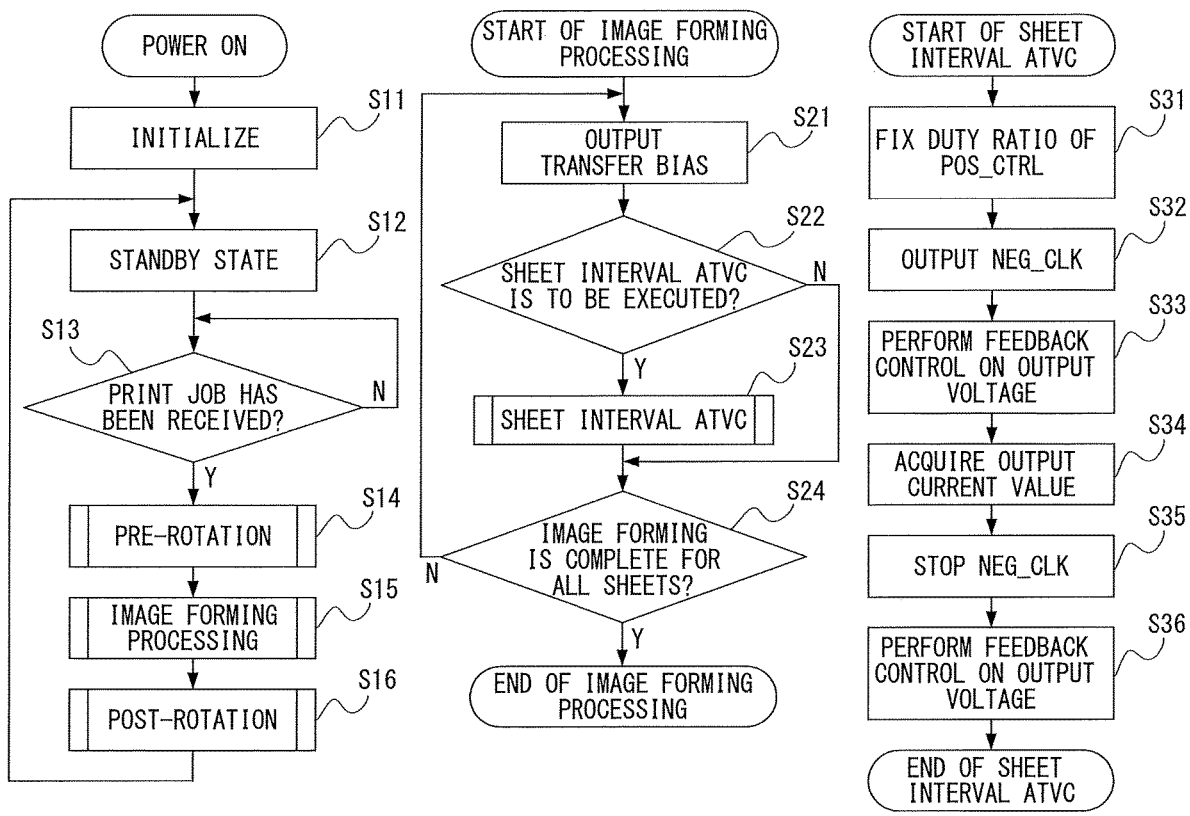
FIG. 6A, FIG. 6B, and FIG. 6C are flow charts for illustrating operations of the image forming apparatus.

FIG. 6A to FIG. 6C are flow charts for illustrating operations of the image forming apparatus 100. Here, a timing when the sheet interval ATVC is executed, and operations of the control device 16 and the secondary transfer high-voltage control device 11 are described. In FIG. 6A, there is illustrated overall operation of the image forming apparatus 100. In FIG. 6B, there is illustrated an operation of the secondary transfer high-voltage control device 11 during the image formation processing. In FIG. 6C, there is illustrated an operation of the secondary transfer high-voltage control device 11 at the time when the sheet interval ATVC is executed.

When a main power switch of the image forming apparatus 100 is operated, and the image forming apparatus 100 enters a state of being powered on, the control device 16 performs initialization processing, and transitions to a standby state (Steps S11 and S12). After transitioning to the standby state, the control device 16 waits until a print job for instructing the image forming apparatus 100 to form an image is acquired from a user interface of the image forming apparatus 100 or an external device connected via a network (Step S13: N).

When the print job is acquired (Step S13: Y), the control device 16 performs the pre-rotation (preparatory operation for the image formation) of the secondary transfer roller 7a before executing the image formation processing, and then executes the image formation processing (Steps S14 and S15). The control device 16 executes the pre-rotation ATVC described above at the time of executing the pre-rotation. When the print job is an instruction to perform the image formation processing successively on a plurality of recording materials P, the control device 16 executes the sheet interval ATVC as needed. When the image formation processing corresponding to the print job is complete (Step S16), the control device 16 performs post-rotation to transition to the standby state (Step S12), and waits until the next print job is acquired.

The operation of the secondary transfer high-voltage control device 11 at the time when the image formation processing of Step S15 is executed is described with reference to FIG. 6B. At this time, the feedback control on the output voltage Vout of the secondary transfer high-voltage generator 8 is performed by the secondary transfer high-voltage control device 11, but a timing to start outputting the output voltage and the target voltage of the output voltage are specified by the control device 16.

When the image formation processing is started, the secondary transfer high-voltage control device 11 drives the first high-voltage generator 12 of the secondary transfer high-voltage generator 8 to output the transfer bias for transferring the toner images from the intermediate transfer belt 5 onto the recording material P (Step S21). The secondary transfer high-voltage control device 11 performs control such that the first high-voltage generator 12 outputs the target voltage as the output voltage Vout (transfer bias). The secondary transfer high-voltage generator 8 performs conditional determination as to whether it is required to execute the sheet interval ATVC (Step S22).

Conditions based on which it is determined whether it is required to execute the sheet interval ATVC include the number of sheets on which the image formation has been performed in succession after the pre-rotation ATVC or the previous sheet interval ATVC, for example. The number is set to 50, for example, so that the sheet interval ATVC is executed before the temperature and the humidity inside the image forming apparatus 100 are changed excessively. When it is required to execute the sheet interval ATVC (Step S22: Y), the secondary transfer high-voltage control device 11 executes the sheet interval ATVC (Step S23). The secondary transfer high-voltage control device 11 corrects the reference voltage Vb based on a result of the sheet interval ATVC.

After the sheet interval ATVC is executed, or when it is not required to execute the sheet interval ATVC (Step S22:

N), the secondary transfer high-voltage control device 11 determines whether the image formation processing is complete for all sheets specified by the print job (Step S24). When the image formation processing is not complete (Step S24: N), the secondary transfer high-voltage control device 11 executes the processing of Step S21 and the subsequent steps repeatedly until the image formation processing is complete. When the image formation processing is complete (Step S24: Y), the secondary transfer high-voltage control device 11 ends the image formation processing corresponding to the print job.

The processing of the secondary transfer high-voltage control device 11 in the sheet interval ATVC of Step S23 is described with reference to FIG. 6C.

When the sheet interval ATVC is started, the secondary transfer high-voltage control device 11 fixes, at the time of finishing transferring the toner images onto the intermediate transfer belt 5 to the recording material P, the duty ratio of the POS_CTRL signal to a value at a trailing edge of the image (Step S31). The secondary transfer high-voltage control device 11 outputs the NEG_CLK signal to drive the second high-voltage generator 13 (Step S32). The secondary transfer high-voltage control device 11 performs the feedback control on the duty ratio of the NEG_CTRL signal so that the output voltage Vout of the secondary transfer high-voltage generator 8 becomes the second target voltage (Step S33).

Thereafter, the secondary transfer high-voltage control device 11 senses the output current a plurality of times, and acquires a value obtained by averaging results of the sensing as the output current value of the secondary transfer high-voltage generator 8 (Step S34). The secondary transfer high-voltage control device 11 stops the NEG_CLK signal to stop driving the second high-voltage generator 13 (Step S35). The secondary transfer high-voltage control device 11 performs the feedback control on the duty ratio of the POS_CTRL signal so that the output voltage Vout of the secondary transfer high-voltage generator 8 becomes the third target voltage set by the control device 16 (Step S36).

As described above, in order that execution of the sheet interval ATVC is complete within short sheet interval time, the secondary transfer high-voltage generator 8 drives the second high-voltage generator 13 while driving the first high-voltage generator 12, which is configured to generate the transfer bias, at the time of rising of the output voltage Vout. As a result, the output voltage Vout can be caused to rise and fall at high speed.

In this embodiment, the output AC voltages of the transformers 12c and 13c are controlled with the voltages input from the transformer input voltage control circuits 12a and 13a, but a method of controlling the output AC voltages of the transformers 12c and 13c is not limited thereto. For example, the voltages input to the transformers 12c and 13c are set to be constant. In this case, the secondary transfer high-voltage control device 11 may input pulse frequency modulation (PFM) signals having constant off times to the transformer drive circuits 12b and 13b to control the output AC voltages of the transformers 12c and 13c. The PFM signals serve as drive control signals for performing drive control of the transformers 12c and 13c. Moreover, in this embodiment, the polarity of the transfer bias has been described as being positive, but the polarity of the transfer bias may be negative depending on the configuration of the image forming apparatus 100.

The image forming apparatus 100 may have a configuration in which the toner image on the photosensitive drum 1 is transferred directly onto the recording material P and not via the intermediate transfer belt 5. Moreover, in addition to the configuration of including the plurality of photosensitive drums 1a to 1d to perform full-color image formation, the image forming apparatus 100 may have a configuration in which mono-color image formation is performed with one photosensitive drum 1.

Processing During Density Tone Correction

In order to form an image having an appropriate tone on the recording material P, the image forming apparatus 100 performs density tone correction. In the density tone correction, a toner image for sensing a density, which is formed on the intermediate transfer belt 5 as a test image, is irradiated with light, and reflected light of the light is sensed, to thereby sense an amount of toner of the toner image. A toner density of the toner image to be formed on the recording material P may be adjusted based on a result of the sensing of the amount of toner to form an image having the appropriate tone. The toner image for sensing the density on the intermediate transfer belt 5, which is sensed by the density tone correction, is not transferred onto the recording material P.

Figure 7A:
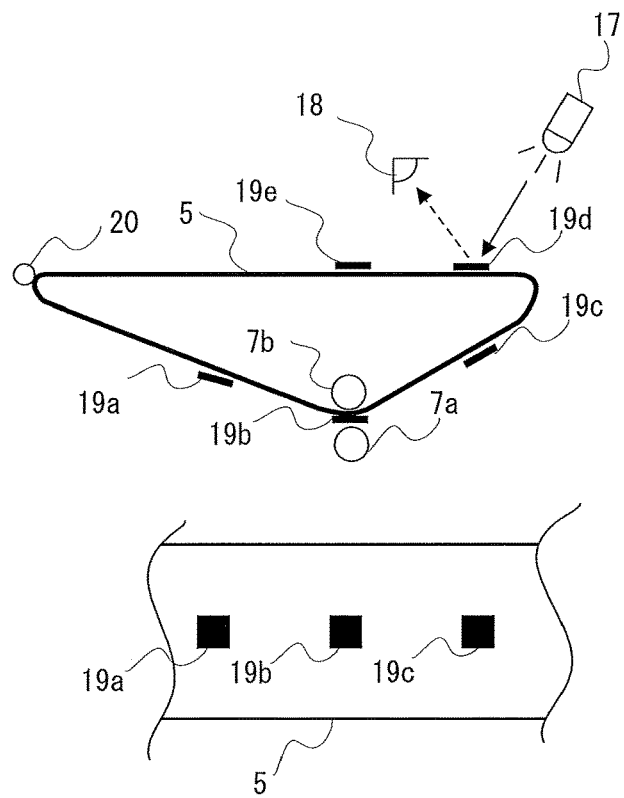
FIG. 7A and FIG. 7B are explanatory diagrams of density tone correction.
Figure 7B:
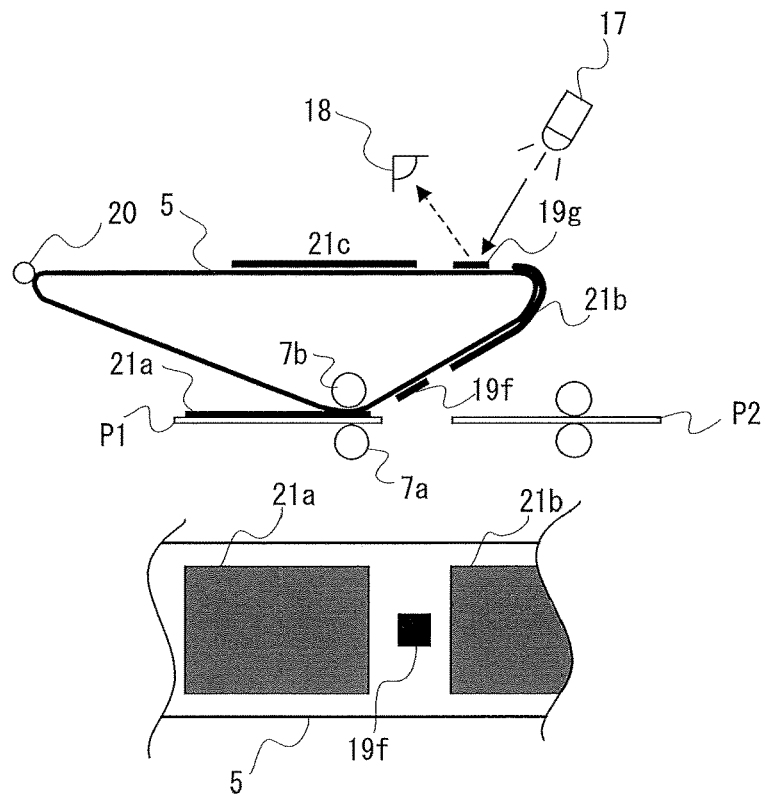

Therefore, in order to prevent toner of the toner image for sensing the density from adhering to the secondary transfer roller 7a, the secondary transfer high-voltage generator 8 is required to apply a non-transfer bias to the secondary transfer roller 7a. The "non-transfer bias" has a voltage polarity that is opposite to the polarity of the transfer bias, and is a voltage with which the toner on the intermediate transfer belt 5 does not adhere to the secondary transfer roller 7a even when passing through the secondary transfer portion 7. The density tone correction is performed during the pre-rotation and in the sheet interval. In order to perform the density tone correction in the sheet interval, it is required to change the output voltage Vout of the secondary transfer high-voltage generator 8 from the transfer bias to the non-transfer bias at high speed in the short sheet interval time. FIG. 7A and FIG. 7B are explanatory diagrams of the density tone correction.

The density tone correction during the pre-rotation is described with reference to FIG. 7A. In the image forming apparatus 100, a light emitting diode (LED) 17, which serves as a light source, is arranged at a position at which the toner image on the intermediate transfer belt 5 may be irradiated. The image forming apparatus 100 includes an optoelectronic element 18 configured to receive reflected light from the toner image of the light from the LED 17 to sense the toner density. The image forming apparatus 100 includes a cleaning roller 20 configured to clean residual toner on the intermediate transfer belt 5.

In the density tone correction, the image forming apparatus 100 forms rectangular toner images for measuring densities, which are called patch images 19a to 19e, in a non-image region on the intermediate transfer belt 5 based on image signals for measuring the densities. The non-image region is a region of a toner image bearing region on the intermediate transfer belt 5 that is not transferred onto the recording material P. During the pre-rotation, the entire surface of the intermediate transfer belt 5 is the non-image region, and during the successive image formation, a region corresponding to the sheet interval is the non-image region.

The patch images 19a to 19e on the intermediate transfer belt 5 are conveyed with the rotation of the intermediate transfer belt 5, and pass through an irradiation spot that is irradiated with the light of the LED 17. At that time, the patch image 19 reflects the light with which the patch image is irradiated by the LED 17. The optoelectronic element 18 receives reflected light that is reflected by the patch image 19, converts the reflected light into an electric signal, and outputs the electric signal. The control device 16 of the controller 101 measures an amount of toner of the patch image 19 based on density values obtained by subjecting the output signal of the optoelectronic element 18 to A/D conversion. The control device 16 measures the amount of toner a plurality of times, and averages the measured amounts of toner. The control device 16 controls amounts of toner of images in the subsequent image processing based on a result of the averaging to form images having the appropriate tone. The patch images 19a to 19e on the intermediate transfer belt 5 are removed by the cleaning roller 20. The intermediate transfer belt 5 having the patch images 19a to 19e removed is used for next image formation.

In order to prevent toner of the patch images 19a to 19e from adhering to the secondary transfer roller 7a when the patch images 19a to 19e pass through the secondary transfer portion 7, the non-transfer bias having the same (negative) polarity as that of the toner is applied to the secondary transfer roller 7a by the secondary transfer high-voltage generator 8. When the non-transfer bias is not applied to the secondary transfer roller 7a, the toner of the patch images 19a to 19e formed on the intermediate transfer belt 5 disadvantageously adheres to the secondary transfer roller 7a. The toner adhering to the secondary transfer roller 7a adheres to a recording material P that is conveyed in the subsequent image formation to cause the image defect. Therefore, it is required to prevent the adhesion of the patch images 19a to 19e.

In the density tone correction during the pre-rotation, the entire region of the intermediate transfer belt 5 is the non-image region, and hence the non-transfer bias is always applied to the secondary transfer roller 7a. Therefore, the secondary transfer high-voltage generator 8 is not required to change the output voltage Vout at high speed. However, in the density tone correction in which patch images 19f and 19g are formed in the sheet interval as illustrated in FIG. 7B, the secondary transfer high-voltage generator 8 is required to complete the switching between the transfer bias and the non-transfer bias within the short sheet interval time.

When the density tone correction is performed in the sheet interval during the image formation processing, the photosensitive drum 1 first transfers, onto the intermediate transfer belt 5, a toner image 21a to be transferred onto the recording material P1. Thereafter, the photosensitive drum 1 similarly transfers the patch image 19f onto the intermediate transfer belt 5, and subsequently transfers, onto the intermediate transfer belt 5, a toner image 21b to be transferred onto the recording material P2.

The toner images 21a and 21b and the patch image 19f, which have been transferred onto the intermediate transfer belt 5, are conveyed by the intermediate transfer belt 5. At a timing at which the patch image 19f passes through the irradiation spot of the LED 17, the optoelectronic element 18 measures an amount of toner of the patch image 19f based on the reflected light of the LED 17. The density tone correction is performed based on a result of the measurement. Thereafter, the toner images 21a and 21b and the patch image 19f are conveyed to the secondary transfer portion 7. The toner images 21a and 21b in an image region are transferred onto the recording material P in the secondary transfer portion 7. During the transfer, the transfer bias is applied to the secondary transfer roller 7a by the secondary transfer high-voltage generator 8.

However, when the transfer bias is applied also in the sheet interval, toner of the patch image 19f formed outside the image region of the intermediate transfer belt 5 adheres to the secondary transfer roller 7a. To address this problem, the secondary transfer high-voltage generator 8 reduces, in a period from when the transfer of the toner image 21a is complete to when a leading edge of the patch image 19f reaches the secondary transfer roller 7a, a positive transfer bias to be applied to the secondary transfer roller 7a to a negative non-transfer bias. The secondary transfer high-voltage generator 8 causes the output voltage Vout to fall so that the positive transfer bias is reduced to the negative non-transfer bias. Moreover, in a period from when the patch image 19f has exited the secondary transfer roller 7a to when a leading edge of the recording material P2 reaches the secondary transfer roller 7a, the secondary transfer high-voltage generator 8 causes the output voltage Vout to rise to the transfer bias of the recording material P2.

Figure 8:
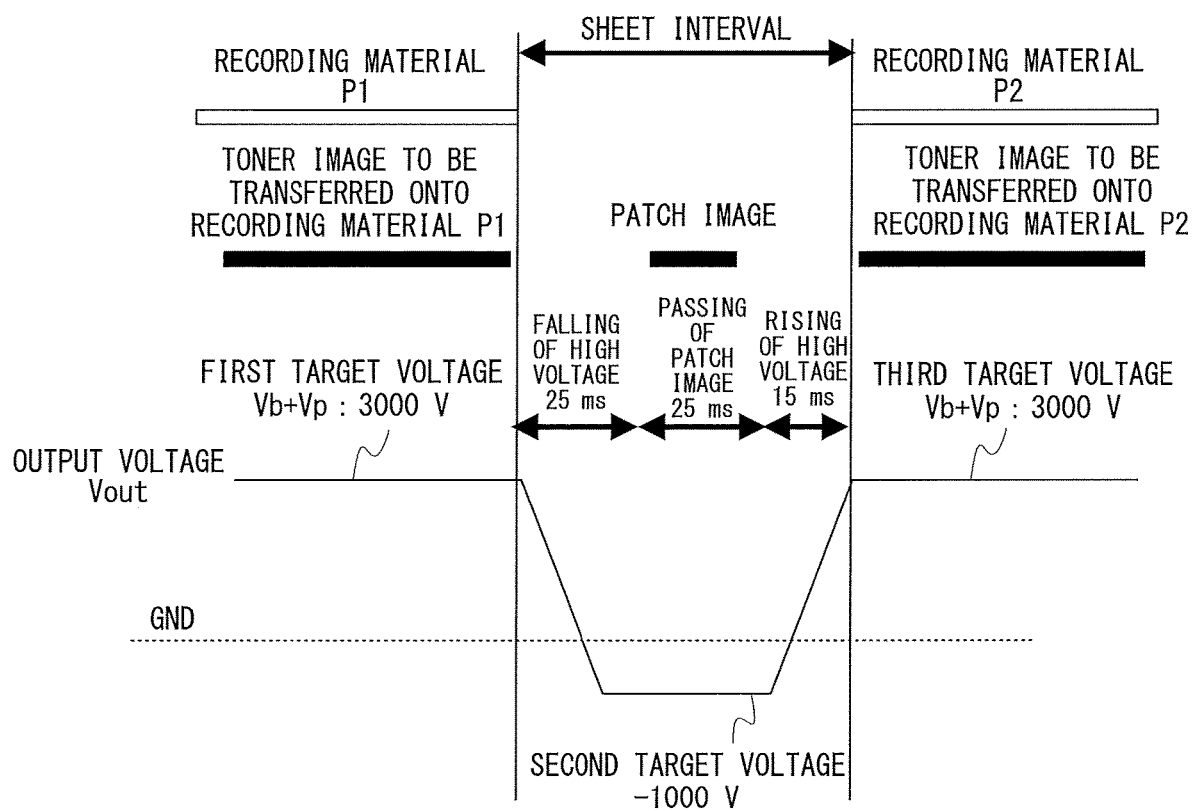
FIG. 8 is an explanatory chart of sheet interval patch image non-transfer control.

FIG. 8 is an explanatory chart of sheet interval patch image non-transfer control for preventing the patch image 19 from being transferred onto the secondary transfer roller 7a in the sheet interval. The transfer bias immediately before the sheet interval patch image non-transfer control is performed is the first target voltage (Vb+Vp=3,000 V). At the time of completion of the transfer to the recording material P1 at the first target voltage, the secondary transfer high-voltage generator 8 causes the output voltage Vout, which is the first target voltage, to fall to the second target voltage (−1,000 V), which is the non-transfer bias. The patch image 19 passes the secondary transfer roller 7a while the second target voltage (−1,000 V) is applied. After a trailing edge of the patch image 19 has passed through the secondary transfer roller 7a, the secondary transfer high-voltage generator 8 causes the output voltage Vout to rise by the time when the leading edge of the recording material P2 is conveyed to the secondary transfer roller 7a. In this example, the output voltage Vout is caused to rise from the second target voltage to the third target voltage (Vb+Vp: 3,000 V), which is the transfer bias. Here, when it is assumed that the sheet interval time is 65 milliseconds, and that time required for the patch image 19 to exit the secondary transfer roller 7a is 25 milliseconds, the secondary transfer high-voltage generator 8 is required to complete the rising and the falling of the output voltage Vout within 40 milliseconds in total. For example, the secondary transfer high-voltage generator 8 is required to complete the falling and the rising of the output voltage Vout in 25 milliseconds and 15 milliseconds, respectively.

Figure 9:
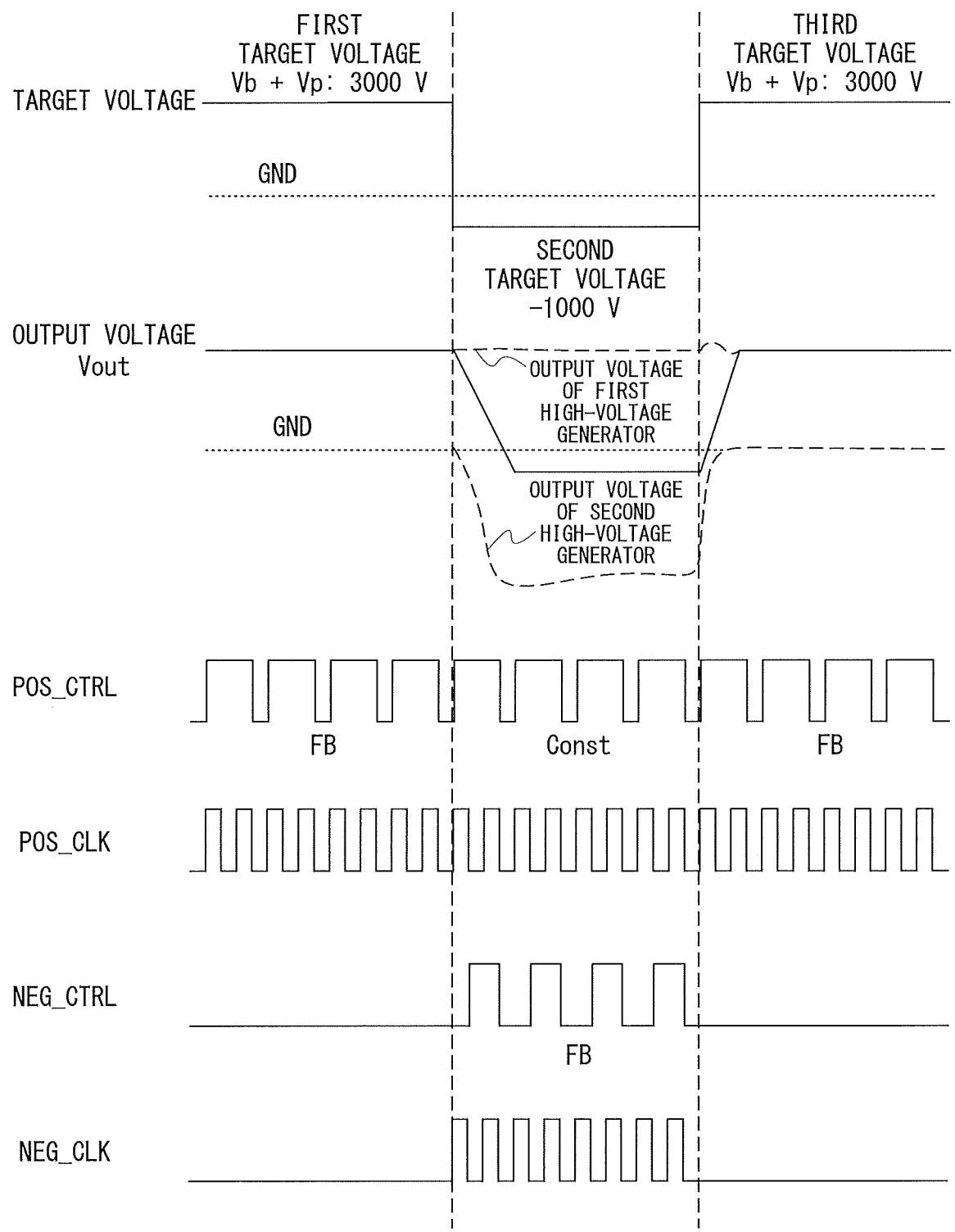
FIG. 9 is an explanatory chart of a control sequence of the secondary transfer high-voltage control device executed when the density tone correction is performed in a sheet interval.

FIG. 9 is an explanatory chart of a control sequence of the secondary transfer high-voltage control device 11 executed when the density tone correction is performed in the sheet interval. First, in order to drive only the first high-voltage generator 12 to perform the secondary transfer, the secondary transfer high-voltage control device 11 outputs the POS_CLK signal to drive the transformer 12c. Then, the secondary transfer high-voltage control device 11 performs the PID control on the duty ratio of the POS_CTRL signal based on the deviation between the output voltage Vout sensed by the output voltage sensor 14 and the first target voltage (3,000 V).

Next, in order to prevent the patch image 19 for the density tone correction from being transferred onto the secondary transfer roller 7a, the secondary transfer high-voltage generator 8 applies the non-transfer bias to the secondary transfer roller 7a. To that end, the secondary transfer high-voltage control device 11 fixes the POS_CTRL signal at the time of completion of the transfer of the toner images onto the recording material P1 to the duty ratio at that time, and outputs the NEG_CLK signal to drive the transformer 13c of the second high-voltage generator 13.

Then, the secondary transfer high-voltage control device 11 performs the PID control on the duty ratio of the NEG_CTRL signal based on the deviation between the output voltage Vout sensed by the output voltage sensor 14 and the second target voltage (−1,000 V). Through this control, the secondary transfer high-voltage generator 8 may cause the output voltage Vout to fall at high speed.

After the output voltage Vout of the secondary transfer high-voltage generator 8 converges to the second target voltage (−1,000 V), the patch image 19 on the intermediate transfer belt 5 passes through the secondary transfer portion 7. At this time, a negative voltage having a polarity that is opposite to that of the transfer bias and is the same as that of the patch image 19 is applied to the secondary transfer roller 7a. Therefore, the patch image 19 is borne on the intermediate transfer belt 5 without being transferred. The secondary transfer high-voltage control device 11 continues to drive the transformer 12c of the first high-voltage generator 12 with the POS_CLK signal also in a period in which the patch image 19 passes through the secondary transfer portion 7.

After the patch image 19 has passed through the secondary transfer portion 7, the secondary transfer high-voltage control device 11 stops the NEG_CLK signal to stop the second high-voltage generator 13. At the same time, the secondary transfer high-voltage control device 11 performs the PID control on the duty ratio of the POS_CTRL signal based on the deviation between the output voltage Vout sensed by the output voltage sensor 14 and the third target voltage (3,000 V). Through this control, the secondary transfer high-voltage generator 8 may cause the output voltage Vout to rise at high speed.

When the output voltage Vout of the secondary transfer high-voltage generator 8 is changed from the second target voltage (−1,000 V) to the third target voltage (3,000 V), the bleeder resistor R61 of the second high-voltage generator 13 has the small resistance value, and the smoothing capacitor C61 is discharged fast. The output voltage Vout of the secondary transfer high-voltage generator 8 is caused to rise at high speed by the discharge of the smoothing capacitor C61, and hence is caused to rise at a higher speed than when the second target voltage is output with only the first high-voltage generator 12. As a result, total time of the falling and the rising of the output voltage Vout required for the sheet interval patch image non-transfer control can be reduced.

Density Tone Correction During Image Formation

Figures 10A, 10B, 10C:
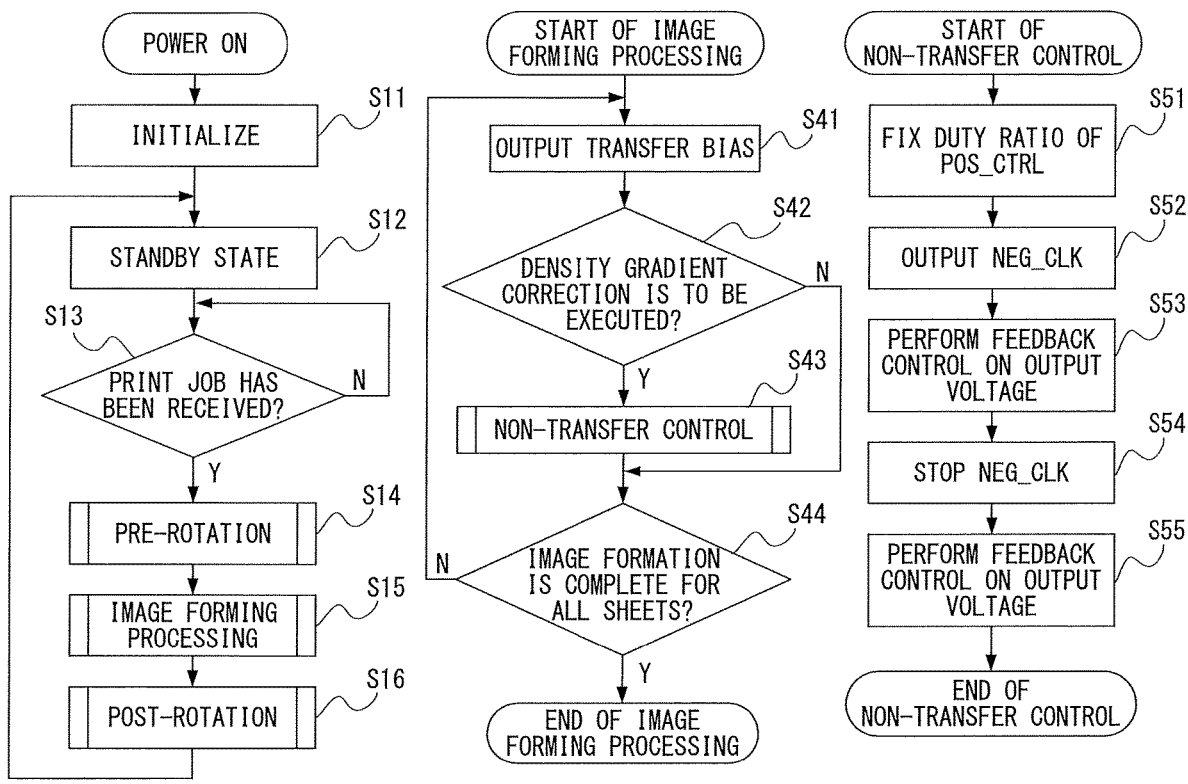
FIG. 10A, FIG. 10B, and FIG. 10C are flow charts for illustrating operations of the image forming apparatus.

FIG. 10A to FIG. 10C are flow charts for illustrating operations of the image forming apparatus 100. Here, a timing when the density tone correction is executed, and operations of the control device 16 and the secondary transfer high-voltage control device 11 are described. In FIG. 10A, there is illustrated overall operation of the image forming apparatus 100, which is the same as the processing of FIG. 6A, and hence a description of FIG. 10A is omitted. In FIG. 10B, there is illustrated an operation of the secondary transfer high-voltage control device 11 during the image formation processing. In FIG. 10C, there is illustrated an operation of the secondary transfer high-voltage control device 11 at the time when the non-transfer control is performed on the patch images.

Processing performed when the image formation processing of Step S15 in FIG. 10A is executed is described with reference to FIG. 10B. At this time, the feedback control of the output voltage Vout of the secondary transfer high-voltage generator 8 is performed by the secondary transfer high-voltage control device 11, but the timing to start the output and the target voltage are specified by the control device 16.

When the image formation processing is started, the secondary transfer high-voltage control device 11 drives the first high-voltage generator 12 of the secondary transfer high-voltage generator 8 to output the transfer bias for transferring the toner images from the intermediate transfer belt 5 onto the recording material P (Step S41). The secondary transfer high-voltage control device 11 controls the first high-voltage generator 12 such that the first high-voltage generator 12 outputs the target voltage as the output voltage Vout (transfer bias). The secondary transfer high-voltage generator 8 performs conditional determination as to whether it is required to execute the density tone correction (Step S42).

Conditions based on which it is determined whether it is required to execute the density tone correction include changes in temperature and humidity of the image forming apparatus 100, and the number of sheets on which the image formation has been performed in succession after the previous density tone correction, for example. When it is required to execute the density tone correction (Step S42: Y), the secondary transfer high-voltage control device 11 executes non-transfer control on the patch images (Step S43). After the non-transfer control of the patch images, or when it is not required to execute the density tone correction (Step S42: N), the secondary transfer high-voltage control device 11 determines whether the image formation processing is complete for all sheets specified by the print job (Step S44). When the image formation processing is not complete (Step S44: N), the secondary transfer high-voltage control device 11 executes the processing of Step S41 and the subsequent steps repeatedly until the image formation processing is complete. When the image formation processing is complete (Step S44: Y), the secondary transfer high-voltage control device 11 ends the image formation processing corresponding to the print job.

Processing of the non-transfer control of the patch images of Step S43, which is performed during the density tone correction, is described with reference to FIG. 10C.

When the non-transfer control of the patch images is started, the secondary transfer high-voltage control device 11 fixes, at the time of finishing transferring the toner images on the intermediate transfer belt 5 onto the recording material P, the duty ratio of the POS_CTRL signal to a value at the trailing edge of the image (Step S51). The secondary transfer high-voltage control device 11 outputs the NEG_CLK signal to drive the second high-voltage generator 13 (Step S52). The secondary transfer high-voltage control device 11 performs the feedback control on the duty ratio of the NEG_CTRL signal so that the output voltage Vout of the secondary transfer high-voltage generator 8 becomes the second target voltage (Step S53).

Thereafter, the secondary transfer high-voltage control device 11 stops the NEG_CLK signal to stop driving the second high-voltage generator 13 (Step S54). The secondary transfer high-voltage control device 11 performs the feedback control on the duty ratio of the POS_CTRL signal such that the output voltage Vout of the secondary transfer high-voltage generator 8 becomes the third target voltage set by the control device 16 (Step S55).

As described above, in order that execution of the density tone correction is complete within short sheet interval time, the image forming apparatus 100 according to this embodiment causes the second high-voltage generator 13 to operate while driving the first high-voltage generator 12, which is configured to generate the transfer bias, at the time of falling of the output voltage Vout of the secondary transfer high-voltage generator 8. As a result, the output voltage Vout of the secondary transfer high-voltage generator 8 can be caused to rise and fall at high speed, the patch images can be prevented from adhering to the secondary transfer roller 7a, and the density tone correction can be performed in the sheet interval.

As described above, the image forming apparatus 100 according to this embodiment includes a high-voltage power supply apparatus having a configuration in which two positive and negative high-voltage generators (first high-voltage generator 12 and second high-voltage generator 13) are connected in series to each other. With the high-voltage power supply apparatus including the two high-voltage generators, the output voltage can be changed at high speed from the state in which the voltage is output by one high-voltage generator to the voltage having the same polarity and the lower absolute value or the voltage having the opposite polarity. As a result, irrespective of whether the polarity of the voltage after the change of the output voltage is positive or negative, the output voltage can be changed at high speed. Therefore, the image forming apparatus 100 can perform image formation at higher speed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. Embodiment(s) of the present invention can also be realized by a computer of a system or apparatus that includes one or more circuits (e.g., application specific integrated circuit (ASIC) or SOC (system on a chip)) for performing the functions of one or more of the above-described embodiment(s).

This application claims the benefit of Japanese Patent Application No. 2017-002469, filed Jan. 11, 2017 which is hereby incorporated by reference herein in its entirety.

What is claimed is:

1. An image forming apparatus, comprising:
   an image forming portion, which is configured to form an image on an image bearing member;
   a transfer portion, which is configured to transfer an image formed on the image bearing member onto a recording material;
   a high-voltage output device including:
      a first high-voltage generator, which is configured to generate a first voltage having a predetermined voltage value; and
      a second high-voltage generator, which is connected in series to the first high-voltage generator, and is configured to generate a second voltage,
      the high-voltage output device being configured to output an output voltage based on the first voltage and the second voltage to apply the output voltage to the transfer portion; and
   a high-voltage control device, which is configured, in a case where the image forming apparatus is switched from a first state to a second state, to perform feedback control on the second voltage so that the output voltage becomes a second target voltage while continuing to drive the first high-voltage generator, the first state being a state in which the first high-voltage generator is driven and the high-voltage output device is caused to output a first target voltage as the output voltage to transfer the image formed on the image bearing member onto the recording material, and the second state being a state in which the second target voltage is output as the output voltage, the second target voltage having a polarity that is the same as a polarity of the first target voltage and an absolute value that is lower than an absolute value of the first target voltage.

2. The image forming apparatus according to claim 1, wherein the high-voltage control device is configured, in a case where image forming apparatus is switched from a state in which the first high-voltage generator and the second high-voltage generator are driven to output the second target voltage having the polarity that is the same as the polarity of the first target voltage as the output voltage, to a state in which a third target voltage is output as the output voltage, to stop driving the second high-voltage generator, and to perform feedback control on the first voltage so that the output voltage becomes the third target voltage, the third target voltage having a polarity that is the same as the polarity of the second target voltage and having an absolute value that is larger than the absolute value of the second target voltage.

3. The image forming apparatus according to claim 1,
   wherein the first high-voltage generator includes a first transformer, a first transformer control device configured to control a voltage to be applied to a primary side of the first transformer, and a first rectifier configured to rectify the voltage boosted by the first transformer to generate the first voltage,
   wherein the second high-voltage generator includes a second transformer, a second transformer control device configured to control a voltage to be applied to a primary side of the second transformer, and a second rectifier configured to rectify the voltage boosted by the second transformer to generate the second voltage,
   wherein the high-voltage control device is configured to control an output AC voltage of the first transformer by controlling the voltage to be applied to the primary side of the first transformer with a first voltage control signal, which is input to the first transformer control device so that a voltage value of the first voltage is controlled, and
   wherein the high-voltage control device is configured to control an output AC voltage of the second transformer by controlling the voltage to be applied to the primary side of the second transformer with a second voltage control signal, which is input to the second transformer control device so that a voltage value of the second voltage is controlled.

4. The image forming apparatus according to claim 3, wherein the high-voltage control device is configured to control the predetermined voltage value of the first voltage with the first voltage control signal, which is a PWM signal, and to control the voltage value of the second voltage with the second voltage control signal, which is a PWM signal.

5. The image forming apparatus according to claim 4, further comprising an output voltage sensor configured to sense the output voltage,
   wherein the high-voltage control device is configured to control the voltage value of the first voltage and the voltage value of the second voltage by controlling duty ratios of the first voltage control signal and the second voltage control signal based on a voltage value of the output voltage sensed by the output voltage sensor.

6. The image forming apparatus according to claim 3,
wherein the first high-voltage generator further includes a first transformer driver configured to drive the first transformer,
wherein the second high-voltage generator further includes a second transformer driver configured to drive the second transformer, and
wherein the high-voltage control device is configured to cause the first transformer driver to drive the first transformer by inputting, to the first transformer driver, a first drive control signal for driving the first transformer, and to cause the second transformer driver to drive the second transformer by inputting, to the second transformer driver, a second drive control signal for driving the second transformer.

7. The image forming apparatus according to claim 6, wherein the high-voltage control device is configured to cause the first transformer driver to drive the first transformer with the first drive control signal, which is a PFM signal, and to cause the second transformer driver to drive the second transformer with the second drive control signal, which is a PFM signal.

8. The image forming apparatus according to claim 3,
wherein the first rectifier includes a first bleeder resistor, which is connected to a secondary side of the first transformer,
wherein the second rectifier includes a second bleeder resistor, which is connected to a secondary side of the second transformer, and
wherein the first bleeder resistor has a resistance value that is larger than a resistance value of the second bleeder resistor.

9. The image forming apparatus according to claim 1, wherein the high-voltage control device is configured, in a case where the output voltage is switched from the first target voltage to the second target voltage, to control the first voltage, which is generated by the first high-voltage generator, irrespective of a voltage value of the output voltage, and to perform feedback control on the second voltage, which is generated by the second high-voltage generator, based on the voltage value of the output voltage.

10. The image forming apparatus according to claim 1,
wherein the image forming portion is configured to form a test image used for tone correction on the image bearing member, and
wherein the image forming apparatus is configured to apply, to the transfer portion, the output voltage that prevents the transfer portion from transferring the test image.

* * * * *